United States Patent [19]

Lupis

[11] 4,144,312

[45] Mar. 13, 1979

[54] DESULFURIZATION OF FLUORITE ORES

[76] Inventor: Claude H. P. Lupis, 900 Hastings St., Pittsburgh, Pa. 15217

[21] Appl. No.: 787,240

[22] Filed: Apr. 13, 1977

[51] Int. Cl.$^2$ ............................................. C01F 11/22
[52] U.S. Cl. ................................... 423/178; 423/490
[58] Field of Search ............... 423/490, 168, 178, 170, 423/638, 541; 75/4–6

[56] References Cited

U.S. PATENT DOCUMENTS

| | | | |
|---|---|---|---|
| 52,120 | 1/1866 | Absterdam | 75/6 |
| 74,217 | 2/1868 | Hamar | 75/6 |
| 1,222,252 | 4/1917 | Wierum | 75/6 X |
| 1,403,283 | 1/1922 | Batchelor | 75/6 X |
| 1,555,078 | 9/1925 | Robertson | 75/6 |
| 2,232,242 | 2/1941 | Jordan | 75/5 X |
| 2,550,173 | 4/1951 | Swinehart | 423/178 |
| 2,687,947 | 8/1954 | Manning et al. | 423/541 |
| 3,656,895 | 4/1972 | Mercade | 75/2 |

FOREIGN PATENT DOCUMENTS

| | | | |
|---|---|---|---|
| 660730 | 4/1963 | Canada | 75/6 |
| 7906 of | 1887 | United Kingdom | 423/638 |

*Primary Examiner*—Brian Hearn
*Attorney, Agent, or Firm*—Pollock, Vande Sande & Priddy

[57] ABSTRACT

Fluorite ores and concentrates commonly contain sulphur as an impurity usually as the sulphate. This sulphur can be largely removed by heating the ore or a concentrate under reducing conditions.

In the preferred process the ore or a concentrate is pelletized with carbon, heated to a temperature up to 900° C. in a neutral atmosphere which is conveniently nitrogen or carbon dioxide or a mixture thereof.

20 Claims, No Drawings

DESULFURIZATION OF FLUORITE ORES

BACKGROUND OF THE INVENTION

1. Field of the Invention

This invention relates to desulphurization of fluorite ores and concentrates.

The invention has application in a preferred instance to fluorite ores and concentrates in particulate form and more particularly to the fluorite ores of sedimentary origin. A particular example of fluorite to which this invention may be applied are those fluorite ores which occur in the Lazio district of Italy.

Many fluorite ores contain sulphur as an impurity and this impurity may be present in the form of sulphates, sulphides or free sulphur. However, the sulphur is principally present as sulphates and is most commonly present as barium sulphate and calcium sulphate.

2. Summary of the Invention

The present invention provides a method of desulphurizing fluorite ores containing sulphur impurities, the method comprising heating such a fluorite ore under reducing conditions to drive off sulfur impurities.

PREFERRED ASPECTS OF THE INVENTION

As a reductant there may be used one or more of carbon, carbon monoxide and hydrogen.

In the presence of carbon, carbon monoxide, and/or hydrogen, reactions of the type listed below occur:

  (1)

$$BaSO_4 + C \rightarrow baO + CO + SO_2$$

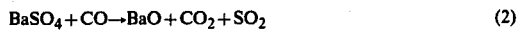  (2)

$$BaSO_4 + CO \rightarrow BaO + CO_2 + SO_2$$

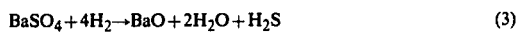  (3)

$$BaSO_4 + 4H_2 \rightarrow BaO + 2H_2O + H_2S$$

Similar reactions will occur in respect of other sulphates such as calcium sulphate. It is particularly to be noted that equations (1) to (3) indicate the type of overall reaction and that actual reactions occurring, many of which occur in steps, are not necessarily represented by the above equations.

In this respect, it should be noted that the actual reactions taking place can be complex and include several stepwise reactions such as reaction of carbon with sulphate to produce carbon monoxide, reaction carbon monoxide with sulphate to produce oxide and carbon dioxide and reaction of carbon dioxide with carbon to produce carbon monoxide. Further, the reducing agent can react with sulphate to produce a sulphide which can be oxidized to the oxide with production of sulphur dioxide.

The heating of the ore is preferably carried out at a temperature of from 700° to 1000° C. However, it is to be noted that it is preferred to heat at a temperature of from 800° to 950° C. as the kinetics of the process appear to be optimized at that temperature and, further, undesirable side reactions are generally avoided.

In this respect, the most undesirable reaction is that of $CaF_2$ in the ore reacting with water vapour to form hydrofluoric acid as is illustrated by the below overall reaction:

  (4)

$$CaF_2 + H_2O \rightarrow CaO + 2HF$$

In general, it may be said that the upper temperature limit of the method is determined by the need to avoid the occurrence of reaction (4) which will be a function of the hydrogen and water vapour contents of the gasses of the furnace. However, because of the high stability of $CaF_2$ it is usually not difficult to maintain conditions where reaction (4) does not occur to any deleterious extent and in practice the maintenance of a temperature of or below 950° C. is sufficient.

Further, as pellet to pellet sintering becomes significant at about 940° C. it is generally preferable to operate at a lower temperature.

The thermodynamics and kinetics of the overall reactions (1), (2) and (3) appear to be enhanced by impurities such as oxides including $SiO_2$ and, to a less extent, other oxides such as $Al_2O_3$ and $P_2O_5$. These impurities often occur naturally. The presence of these impurities tend to displace the reactions (1), (2) and (3) to the right. In this respect, it may be noted that reaction (2) could be rewritten.

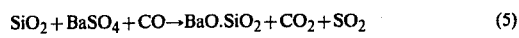  (5)

$$SiO_2 + BaSO_4 + CO \rightarrow BaO \cdot SiO_2 + CO_2 + SO_2$$

and that the driving force of reaction (5) is greater than that of reaction (2). Thus, in the presence of such impurities, the chemical activity of BaO (and CaO) can be considered to be lowered and the equilibrium of the reactions is displaced to the right.

The effects of the impurities is most apparent when they are in intimate contact with the sulphates and the oxides which are formed.

In the most preferred method of performing the invention, an ore is concentrated to an ore cake and mixed with powdered carbon in amounts of from 0.3 to 4% by weight. However, this mixing with carbon is not essential. The amount of carbon to be used will depend principally on the amount of sulphur in the ore, the required degree of sulphur removed, and also on whether the ore is heated in pelletized form. The carbon may have various origins but is commonly from coal, coke, or graphite. After mixing with carbon the mixture is preferably pelletized although this also is not essential. Agglomeration or compaction is conveniently carried out by extrusion or disc-pelletizing with inclusion of grog material.

When pellets are formed, they are conveniently dried and typical drying times and temperatures are 1½ hours at 130° C. Thereafter the pellets are delivered to a furnace.

The furnace may be of a direct heating type in which the gases originating from the burning of a fuel such as oil, natural gas, methane or coal, are brought into direct contact with the pellets, or of an indirect heating type in which heat is transmitted through the walls of the furnace. Apart from being more economic, direct heating can supply carbon, carbon monoxide and hydrogen to the pellets.

The furnace is used to bring the pellets to a temperature in the range 800° to 950° C. and the pellets are maintained at that temperature for a time appropriate to the physical characteristics of the pellets such as size and porosity, the composition of the pellets and the composition of the atmosphere within the furnace. Residence times in the furnace at reaction temperature can vary from 5 minutes to 1 hour with 40 minutes being the most common. In this respect residence time should be adjusted to obtain the desired and practical sulphur removal and it may be noted that complete sulphur removal is not generally required.

The atmosphere within the furnace is desirably a flowing neutral atmosphere. That atmosphere preferably comprises nitrogen and/or carbon dioxide. The presence of some water vapour does not appear to be detrimental.

After treatment in the furnace the desulphurized pellets are ready for such further treatment as is desired.

The invention will now be illustrated with the aid of the following general example which is not to be considered as limiting.

GENERAL EXAMPLE

A fluorite ore having sulphur content of 0.9% by weight from the Lazio district of Italy is obtained as a concentrate in the form of filter cake.

The concentrate is mixed with 1% by weight carbon and grog material is added. Thereafter, the mixture is pelletized.

The pellets are dried for 1½ hours at 130° C. and then charged to a direct heating furnace.

In the furnace the pellets are heated to a temperature of about 950° C. and maintained at that temperature for 20 minutes.

The sulphur content of the ore is significantly reduced.

FACTORS OF EFFECTING SULPHUR REMOVAL

The results of laboratory experiments to determine the effects of various processing conditions are described in the following section and are summarized in Tables 1 to 3.

Pianciano fluorspar concentrate in the form of filter cake was used in all the tests.

The chemical composition of the filter cake, on a dry basis was, on average:

| Calcium fluoride | $CaF_2$ | 77.57% |
|---|---|---|
| Silica | $SiO_2$ | 6.47% |
| Barium sulphate | $BaSO_4$ | 2.76% (.38% S) |
| Phosphorous | | 1.16% |
| Sulphur (Total) | | 0.9% |

As will be observed from the test results below, the sulphur content of 0.9% is only an average figure and in some instances over 1% sulphur was removed.

Electron microprobe analysis showed that the sulphur was dispersed throughout the filter cake in particles of the order of one micron in size.

EXPERIMENTAL PROCEDURE

Pellets were produced from the filter cake by three methods:
(i) dry pressing in a 1 cm. die.
(ii) extrusion of wet filter cake (40% moisture) and hand rolling into balls.
(iii) forming on a small disc pelletiser.

Unless otherwise indicated, where carbon additions were made, the carbon and filter cake were ground together to produce intimate mixing. After forming all pellets were dried in air at 150° C. before being introduced into a furnace at a maximum of 400° C. This procedure was found desirable to prevent thermal spalling. The furnace was then raised to its operating temperature.

A flow of gas (usually a gas mixture) was passed through the furnace and then through an absorption vessel in which the sulphur dioxide was continually titrated by the standard iodate method. Bromate titrations were also used to check for the presence of carbonyl sulphide (COS) in the product gases. No indication of the presence of carbonyl sulphide was found. In a number of experiments the total sulphur absorbed was determined gravimetrically by precipitating barium sulphate. Good agreement was obtained between the two methods.

Alternatively, the furnace could be evacuated to a pressure of less than 1 mm. of mercury.

Additional experiments involved measurement of
(i) Weight loss as a function of temperature, and
(ii) shrinkage as a function of temperature.

Analysis of sulphur after desulphurization was not attempted directly. It is felt that under appropriate conditions more than 90% of the sulphur is removed. Evidence to support this is:

(i) The analysis supplied gave the sulphur analysis as 0.9% and it was stated that the concentration of sulphur was never greater than 1.1%. Sulphur removal of 1% has been obtained regularly.

(ii) Comparison of electron probe micrographs on pellets before and after desulphurization indicated that at least 90% sulphur removal had been obtained.

(iii) Addition of 0.25% sulphur as barium sulphate to the concentrate resulted in an increase of nearly 0.25% sulphur removal under appropriate conditions, and (iv) Re-oxidation of a desulphurized pellet from which 1.0% sulphur had been removed, followed by remixing with 1% carbon and reprocessing released an additional 0.08% sulphur. This indicates a 92.6% sulphur removal in a single reduction step.

RESULTS

The results are set out in Tables I, II and III below. General results are set out as follows:

(a) Reduction of crushed concentrate, or concentrate mixed with up to 2% carbon (as graphite), at 910° C., in a stream of carbon monoxide, nitrogen/carbon monoxide (1:1) or carbon dioxide/carbon monoxide (1:9) resulted in the removal of approximately 0.5% sulphur in five to ten minutes. Negligible additional sulphur removal took place at longer times. It was confirmed, by micro-probe analysis, that the residual solid from a carbon/carbon monoxide reduction retained half the original sulphur present.

(b) Reduction of crushed concentrate, mixed with 2% graphite at 900° C. in a stream of pure nitrogen or a nitrogen/carbon dioxide mixture (1:1) resulted in removal of approximately 1% sulphur within ten minutes. Micro-probe analysis confirmed that the residual solid contained approximately 0.1% sulphur. Reduction at 800° C., under the same conditions, was much slower and only 0.6% sulphur was removed after sixty minutes. Sulphur removal continued after that time.

(c) Heating the crushed concentrate in a flowing nitrogen atmosphere at 910° C., without carbon addition, also resulted in some sulphur removal but again the rate was slow and less than 0.5% sulphur removal was obtained in sixty minutes.

(d) Reduction in gas mixtures containing any appreciable quantity of carbon monoxide reduced about half the sulphur to sulphides. This was confirmed by oxidising the previously reduced specimen in an air stream when some sulphur dioxide was produced. The remaining sulphur could be removed by further carbon reduction in a nitrogen stream.

From the above and the test results the following was concluded:

(a) The reduction of a pellet of fluorspar concentrate in a flowing nitrogen/carbon monoxide gas stream at 910° C. resulted in a fast initial removal of sulphur but the total sulphur removal obtained in thirty minutes was less than 0.1%.

(b) Heating a pellet containing 2% graphite in an air stream resulted in the loss of 0.2% sulphur in thirty minutes.

(c) Reduction of a graphite containing pellet in a nitrogen/carbon monoxide (1:1) atmosphere gave a low rate of sulphur removal and about 0.3% sulphur was removed in sixty minutes.

(d) Reduction of a graphite containing pellet in a nitrogen or nitrogen/carbon dioxide (1:1) mixture resulted in the loss of approximately 1% sulphur within ten minutes of the furnace reaching 910° C. The sulphur removal was only slightly less in the presence of the carbon dioxide.

(e) Heating of carbon containing pellets in a dynamic vacuum (approximately 1 torr) for thirty minutes produced pellets containing less than 0.1% sulphur as measured by micro-probe analysis.

(f) In all cases the pressed pellets showed marked sintering with a reduction of volume of approximately 50%. The pellets were hard and difficult to break.

As a result of the above tests the applicant has concluded as follows:

Furnace Atmosphere Composition

Pure nitrogen, pure carbon dioxide and mixtures of these two gases proved to be satisfactory purge gases. Removal of gaseous products by evacuation is also a satisfactory method. The presence of some water vapour was not detrimental to the sulphur removal process. Small quantities of carbon monoxide (2%) or oxygen (2%) reduced the sulphur removal from single pellets. The performance of a packed bed of pellets may not be as sensitive to excess carbon monoxide or oxygen.

It is possible to produce suitable hot gas mixtures, to supply both heat and purge gases, by the controlled combustion of producer gas or natural gas or other fuels with air, or by electrically heating the gases.

Temperature

Sulphur removal commences at about 700° C. but is not substantially complete until the temperature reaches 900° C. The rate of sulphur removal appears to be limited by the rate of heat transfer to the pellets. Pellet to pellet sintering becomes significant at about 940° C.

Carbon Content

The quantity of carbon required for fast and effective removal of sulphur seems to depend on the type of carbon used. The optimum 'high grade' graphite content was about 2.5% whereas additions of 1% metallurgical coke gave rapid sulphur removal. Additions of 0.5% metallurgical coke gave almost complete sulphur removal but at a significantly slower rate than the 1% additions. Carbon in the form of 'char' was not very suitable in the range of additions tried.

Size of Coke Particles

In general it appears that for a constant coke content larger coke particles produce an initially higher rate of sulphur removal but a lower overall sulphur removal. Fine coke particles probably result in more economic usage.

Effect of Pellet Size

The laboratory studies used pellets weighing approximately one gram (approximately 1 cm. diameter). Sulphur removal from eight gram pellets was fast but the pellets cracked severely. Large pellets produced with 15% grog returns did not crack to any appreciable extent.

Method of Pelletizing

Pellets were produced by dry pressing, extrusion, hand rolling 'balls', and disc pelletized. The green strength of the 'rolled balls' was highest and that of the disc pelletized material was lowest but should be satisfactory for industrial use.

The water content of the rolled balls was 40% while that of disc pelletized material was 25%.

Disc pelletized material was slightly more porous than that produced by other methods and gave higher sulphur removal.

Packed Bed Operation

Sulphur removal was obtained from a fixed vertical packed bed of pellets in which a hot zone was moved upwards through the bed by means of a moving furnace. There does not appear to be any reduction in the efficiency of sulphur removal in packed beds.

Shrinkage

Shrinkage of the pellets commences above 760° C. The extent of shrinkage appears to depend on the temperature only and not on the time held at a particular temperature. A total linear shrinkage of between 16 to 20% was observed.

Weight Loss

The weight loss during heating involves that associated with loss of water, sulphur and carbon. The weight loss occurs in two definite stages. In one experiment a 2.7% loss occurred up to 600° C. and a total loss of 6.1% at 900° C. The weight loss seemed to be a function of the temperature to which the material is heated rather than the time held at that temperature.

TABLE I

| RUN NO. | MAXIMUM TEMP ° C | CARBON % | CARBON TYPE | COMPACTION METHOD | GAS ATMOSPHERE | % SULPHUR REMOVAL AFTER 10 min | 20 min | 30 min | 40 min |
|---|---|---|---|---|---|---|---|---|---|
| B 1 | 800 | 5 | Graphite | Dry Press | $N_2$ | | | | 0.55 |
| B 2 | 850 | " | " | " | " | | 0.81 | 0.9 | 0.96 |
| B 3 | 870 | " | " | " | " | | 0.82 | 0.91 | 0.94 |
| B 4 | 890 | " | " | " | " | | 0.84 | 0.96 | 0.96 |
| B 5 | 910 | " | " | " | " | | 0.61 | 0.95 | 0.96 |
| B 6 | 910 | " | " | " | " | | 0.88 | 0.92 | 0.925 |
| B 7 | 1000 | " | " | " | " | | 0.93 | 0.95 | 0.955 |
| B 8 | 900 | " | " | " | " | | 0.92 | 0.95 | |
| B 9 | " | 2.5 | " | " | " | | 0.94 | 0.98 | 0.98 |
| B10 | " | 1.25 | " | " | " | | 0.66 | 0.70 | 0.72 |
| B11 | " | 2.5 | " | " | Air | | 0.52 | 0.60 | 0.61 |

TABLE I-continued

| RUN NO. | MAXIMUM TEMP °C | CARBON % | CARBON TYPE | COMPACTION METHOD | GAS ATMOSPHERE | % SULPHUR REMOVAL AFTER 10 min | 20 min | 30 min | 40 min |
|---|---|---|---|---|---|---|---|---|---|
| B12 | " | 5 | " | " | N₂ | | 0.89 | 0.91 | 0.91 |
| B13 | " | " | " | " | CO₂ | | 0.87 | 0.97 | 0.97 |
| B14 | " | " | " | " | N₂/CO₂ 4/1 | | 0.94 | 0.95 | 0.95 |
| B15 | " | " | Char. | Extrud-ball | N₂ | | 0.32 | 0.32 | 0.32 |
| B16 | " | " | " | Dry Press | " | | | | 0.40 |
| B17 | " | " | " | Extrud-ball | N₂/Air | | 0.32 | 0.33 | 0.33 |
| B18 | " | " | " | Dry Press | " | | 0.39 | 0.40 | 0.40 |
| B19 | " | " | Graphite | Extrud-Ball | N₂ | | 0.89 | 0.90 | 0.90 |
| B20 | " | 2.5 | Char. | Dry Press | " | | 0.49 | 0.50 | 0.50 |
| B21 | " | 1.25 | " | " | " | | 0.62 | 0.65 | 0.65 |
| B22 | " | 1.0 | " | " | " | | 0.64 | 0.65 | 0.65 |
| B23 | " | 2.5 | Gas Coke | " | " | | | 0.90 | 0.90 |

TABLE II

| RUN NO. | MAXIMUM TEMP °C | CARBON % | Type | COMPACTION METHOD | GAS ATMOSPHERE | % SULPHUR REMOVAL AFTER 10 min | 20 min | 30 min | 40 min |
|---|---|---|---|---|---|---|---|---|---|
| C 1 | 900 | 2 | Gas Coke | Dry Press | N₂ | | 0.87 | 0.95 | 0.95 |
| C 2 | " | 1.5 | " | " | " | | 0.97 | 0.99 | 0.99 |
| C 3 | " | 1 | " | " | " | | 0.96 | 0.99 | 0.99 |
| C 4 | " | 1.5 | Coal | " | " | | 0.435 | 0.435 | |
| C 5 | " | " | Gas Coke | Extrud-ball | " | | 0.80 | 0.82 | |
| C 6 | " | " | " | " | " | | 0.82 | 0.83 | |
| C 7(a) | " | " | " | " | N₂/CO₂4/1 | | 0.84 | 0.84 | 0.84 |
| C 8(b) | " | " | " | " | " + 2% Air | | 0.5 | 0.65 | 0.68 |
| C 9(c) | " | " | " | " | N₂/CO₄/1 | | 0.87 | 0.87 | 0.87 |
| C10(d) | " | " | " | " | " + 1% CO | | 0.77 | 0.80 | 0.80 |
| C11(e) | " | " | " | " | N₂/CO₂4/1 | | 0.82 | 0.83 | 0.83 |
| C12(f) | " | " | " | " | " | | | | 0.85 |
| C13 | " | 0.5 | Met Coke | Dry Press | " | | 0.80 | 0.90 | 0.92 |
| C14 | " | 1.0 | " | " | " | | 0.91 | 0.92 | 0.92 |
| C15 | " | 1.5 | " | " | " | | 0.92 | 0.93 | 0.94 |
| C16 | " | 1.0 | " | Disc Pelletised | " | | 0.75 | 0.98 | 0.99 |
| C17(g) | " | 1.0 | " | " | " | Total sulphur removal | | | 0.997 |
| C18 | " | 1.0 | Korean Graphite | Dry Press | " | | 0.87 | 0.96 | 0.97 |
| C19 | " | 1.0 | Met Coke | Disc Pelletised | " + 20%H₂O | | 0.78 | 0.89 | 0.91 |

TABLE III

| RUN NO. | MAXIMUM TEMP °C | CARBON % | Type | COMPACTION METHOD | GAS ATMOSPHERE | % SULPHUR REMOVAL AFTER 10 min | 20 min | 30 min | 40 min |
|---|---|---|---|---|---|---|---|---|---|
| D 1(h) | 900 | 1.0 | Met.Coke | Dry Press | N₂/CO₂ 4/1 | 0.27 | 0.78 | 0.905 | 0.91 |
| D 2(i) | " | " | " | " | " | 0.49 | 0.75 | 0.85 | 0.87 |
| D 3(j) | " | " | " | " | " | 0.48 | 0.72 | 0.83 | 0.90 |
| D 4(k) | " | " | " | " | " | 0.475 | 0.65 | 0.75 | 0.81 |
| D 5(l) | " | " | " | " | " | 0.53 | 0.69 | 0.75 | 0.80 |
| D 6(m) | " | " | " | " | " | | 0.27 | 0.29 | 0.29 |

NOTES

| | |
|---|---|
| Run No. C 7(a) | Twenty pellets in bed |
| Run No. C 8(b) | Twenty pellets in bed |
| Run No. C 9(c) | Air added at top of bed |
| Run No. C10(d) | Air added at top of bed |
| Run No. C11(e) | Forty pellets in bed |
| Run No. C12(f) | Large pellet (8g) - pellet cracked badly |
| Run No. C17(g) | Approx. 150 pellets moving zone heating Residence time 20 mins. |
| Run No. D 1(h) | 140-200# Coke |
| Run No. D 2(i) | 70-140# Coke |
| Run No. D 3(j) | 50- 70# Coke |
| Run No. D 4(k) | 40- 50# Coke |
| Run No. D 5(l) | 30- 40# Coke |
| Run No. D 6(m) | 16- 30# Coke |

I claim:

1. A method for reducing the sulphur content of fluorite ore or concentrate containing sulphur in the form of metal sulphates as an impurity which method comprises heating said fluorite ore or concentrate at temperatures between 700° and 1,000° C. under reducing conditions whereby said metal sulphates are transformed into metal oxides, and removing the sulphur in the form of gaseous compounds of sulphur via the effluent gases.

2. The method of claim 1 wherein said temperatures are from 800° to 950° C.

3. The method of claim 1 wherein the reducing conditions are at least in part supplied by the presence of at least one selected from the class consisting of carbon, carbon monoxide and hydrogen.

4. The method of claim 1 wherein the reducing conditions are at least in part supplied by the presence of hydrogen gas.

5. The method of claim 1 wherein the reducing conditions are at least in part supplied by the presence of carbon.

6. The method of claim 5 wherein the carbon is in the form of graphite or coke.

7. The method of claim 5 including the prior step of forming pellets of ore or concentrate and carbon.

8. The method of claim 7 wherein said pellet contains up to 2.5% by weight of carbon.

9. The method of claim 7 wherein the pellet contains from 0.3 to 4% by weight of carbon.

10. The method of claim 7 wherein said pellets are dried prior to the heating.

11. The method of claim 7 wherein the temperature is sufficiently low that substantially no sintering between the pellets occurs.

12. The method of claim 5 wherein said temperatures are from 800° to 950° C., and wherein the ore or concentrate is maintained in a flow of gases consisting essentially of nitrogen and carbon dioxide.

13. The method of claim 1 wherein said temperatures are below about 940° C.

14. The method of claim 1 wherein the residence time at said temperatures is from 5 minutes to 1 hour.

15. The method of claim 1 wherein less than about 2% carbon monoxide and less than about 2% oxygen are present.

16. The method of claim 1 wherein $SiO_2$ is present in the fluorspar.

17. The method of claim 16 wherein $Al_2O_3$ and $P_2O_5$ is present in said fluorspar.

18. The method of claim 1 wherein said sulphur is present in particles of about 1 micron in size.

19. The method of claim 1 wherein said sulphate contains barium sulphate and said barium sulphate is transformed into barium oxide, and said sulphur is removed in the form of $SO_2$ or $H_2S$ or both.

20. The method of claim 1 wherein the temperature is sufficiently low that substantially no sintering occurs.

* * * * *